(12) United States Patent
Mills

(10) Patent No.: US 10,350,993 B2
(45) Date of Patent: Jul. 16, 2019

(54) FUEL SYSTEM HAVING MULTIPLEX DIRECTOR

(71) Applicant: Eaton Corporation, Cleveland, OH (US)

(72) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/718,729

(22) Filed: Sep. 28, 2017

(65) Prior Publication Data

US 2018/0015820 A1    Jan. 18, 2018

Related U.S. Application Data

(63) Continuation of application No. PCT/US2016/024687, filed on Mar. 29, 2016.

(Continued)

(51) Int. Cl.
  *F02M 25/08*     (2006.01)
  *B60K 15/03*     (2006.01)
  (Continued)

(52) U.S. Cl.
  CPC .. *B60K 15/03504* (2013.01); *B60K 15/03519* (2013.01); *F02M 25/089* (2013.01); *F02M 37/0082* (2013.01); *B60K 2015/03514* (2013.01)

(58) Field of Classification Search
  CPC ............... F02M 25/08; F02M 25/0809; F02M 25/0818; F02M 25/0827; F02M 25/0836;
  (Continued)

(56) References Cited

U.S. PATENT DOCUMENTS 6,367,457 B1 *   4/2002   Mancini ........... B60K 15/03504
                                                              123/516
7,866,356 B2     1/2011   Benjey
                     (Continued)

FOREIGN PATENT DOCUMENTS

EP     2823981 A1    1/2015
JP     2011169274 A  9/2011

OTHER PUBLICATIONS

International Search Report and Written Opinion for International Application No. PCT/US2016/024687 dated Jun. 20, 2016, 13 pages.

(Continued)

*Primary Examiner* — John Kwon
*Assistant Examiner* — Johnny H Hoang
(74) *Attorney, Agent, or Firm* — RMCK Law Group PLC

(57) ABSTRACT

A fuel tank system having a fuel tank and a fuel vapor recovery system including a vapor vent line fluidly coupled between the fuel tank and a canister, and a vapor purge line fluidly coupled to the canister. A multiplex director is selectively fluidly coupled to a first location in the fuel vapor recovery system and a second location in the fuel vapor recovery system. The multiplex director is movable between a first position where the multiplex director is fluidly coupled to the first location and is fluidly blocked from the second location, and a second position where the multiplex director is fluidly coupled to the second location and is fluidly blocked from the first location. The multiplex director is configured to monitor at least one of a pressure and a hydrocarbon concentration in the first location and the second location when fluidly coupled thereto.

20 Claims, 3 Drawing Sheets

Related U.S. Application Data

(60) Provisional application No. 62/139,777, filed on Mar. 29, 2015.

(51) Int. Cl.
 *B60K 15/035* (2006.01)
 *F02M 37/00* (2006.01)

(58) Field of Classification Search
 CPC ...... F02M 25/089; F02M 25/37; F02M 25/00; F02M 25/0023; F02M 25/0052; F02M 25/0058; F02M 25/0082; F02M 25/0088; F02M 25/0094; F02M 2025/0854; F02M 2025/0881; B60K 15/03; B60K 15/03504; B60K 15/03519
 USPC ................ 123/505, 510, 512, 513, 516–521
 See application file for complete search history.

(56) References Cited

U.S. PATENT DOCUMENTS

| | | |
|---|---|---|
| 2003/0205272 A1 | 11/2003 | Benjey et al. |
| 2004/0089062 A1 | 5/2004 | Matsubara et al. |
| 2006/0081224 A1* | 4/2006 | Spink ............... B60K 15/03519 123/519 |
| 2008/0302339 A1 | 12/2008 | Krogull et al. |
| 2009/0044785 A1* | 2/2009 | Maly .................. F02M 25/0818 123/519 |
| 2012/0152210 A1* | 6/2012 | Reddy .................. F02M 25/089 123/520 |
| 2013/0160877 A1 | 6/2013 | Walter et al. |
| 2016/0368371 A1* | 12/2016 | Hill .................. B60K 15/03519 |

OTHER PUBLICATIONS

European Search Report for EP Application No. 16773985.3 dated Oct. 18, 2018, 8 pages.

* cited by examiner

FUEL SYSTEM HAVING MULTIPLEX DIRECTOR

CROSS-REFERENCE TO RELATED APPLICATIONS

This application is a continuation of International Application No. PCT/US2016/024687 filed Mar. 29, 2016, which claims priority to U.S. Provisional Application No. 62/139,777 filed on Mar. 29, 2015, which is incorporated by reference in its entirety as if set forth herein.

FIELD

The present disclosure relates generally to fuel tanks on passenger vehicles and more particularly to a fuel tank that includes a multiplex director.

BACKGROUND

To prevent fuel vapors from entering the atmosphere, a fuel vapor emission control system can be used to capture and store vapors produced inside the vehicle fuel system. The vapors are then directed to an intake of the vehicle engine where they are burned. However, fuel vapor emission control systems are becoming increasingly more complex, in large part in order to comply with environmental and safety regulations imposed on manufacturers of gasoline powered vehicles. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle. In addition to fuel vapor recovery, to further prevent vapors from entering the atmosphere, the fuel vapor emission control system may be required to detect a leak in the fuel system or determine hydrocarbon concentration of the vapors.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

The present disclosure will become more fully understood from the detailed description and the accompanying drawings, wherein.

SUMMARY

In one aspect, a fuel tank system is provided. The fuel tank system includes a fuel tank and a fuel vapor recovery system configured to recapture and recycle emitted fuel vapor, the fuel vapor recovery system including a vapor vent line fluidly coupled between the fuel tank and a canister, and a vapor purge line fluidly coupled to the canister. A multiplex director is selectively fluidly coupled to a first location in the fuel vapor recovery system and a second location in the fuel vapor recovery system. The multiplex director is movable between a first position where the multiplex director is fluidly coupled to the first location and is fluidly blocked from the second location, and a second position where the multiplex director is fluidly coupled to the second location and is fluidly blocked from the first location. The multiplex director is configured to monitor at least one of a pressure and a hydrocarbon concentration in the first location and the second location when fluidly coupled thereto.

In another aspect, a method of operating a fuel vapor recovery system is provided. The fuel vapor recovery system is operably associated with a fuel tank system having a fuel tank. The fuel vapor recovery system is configured to recapture and recycle emitted fuel vapor and includes a vapor vent line fluidly coupled between the fuel tank and a canister, and a vapor purge line fluidly coupled to the canister. The method includes fluidly segregating the fuel tank from the vapor vent line, moving a multiplex director to a first position where multiplex director is fluidly coupled to a first location in the fuel vapor recovery system, and monitoring at least one of a pressure and a hydrocarbon concentration in the first location. The method further includes moving the multiplex director to a second position where the multiplex director is fluidly coupled to a second location in the fuel vapor recovery system, and monitoring at least one of a pressure and a hydrocarbon concentration in the vapor purge line when in the second position.

DETAILED DESCRIPTION

Figure 1:
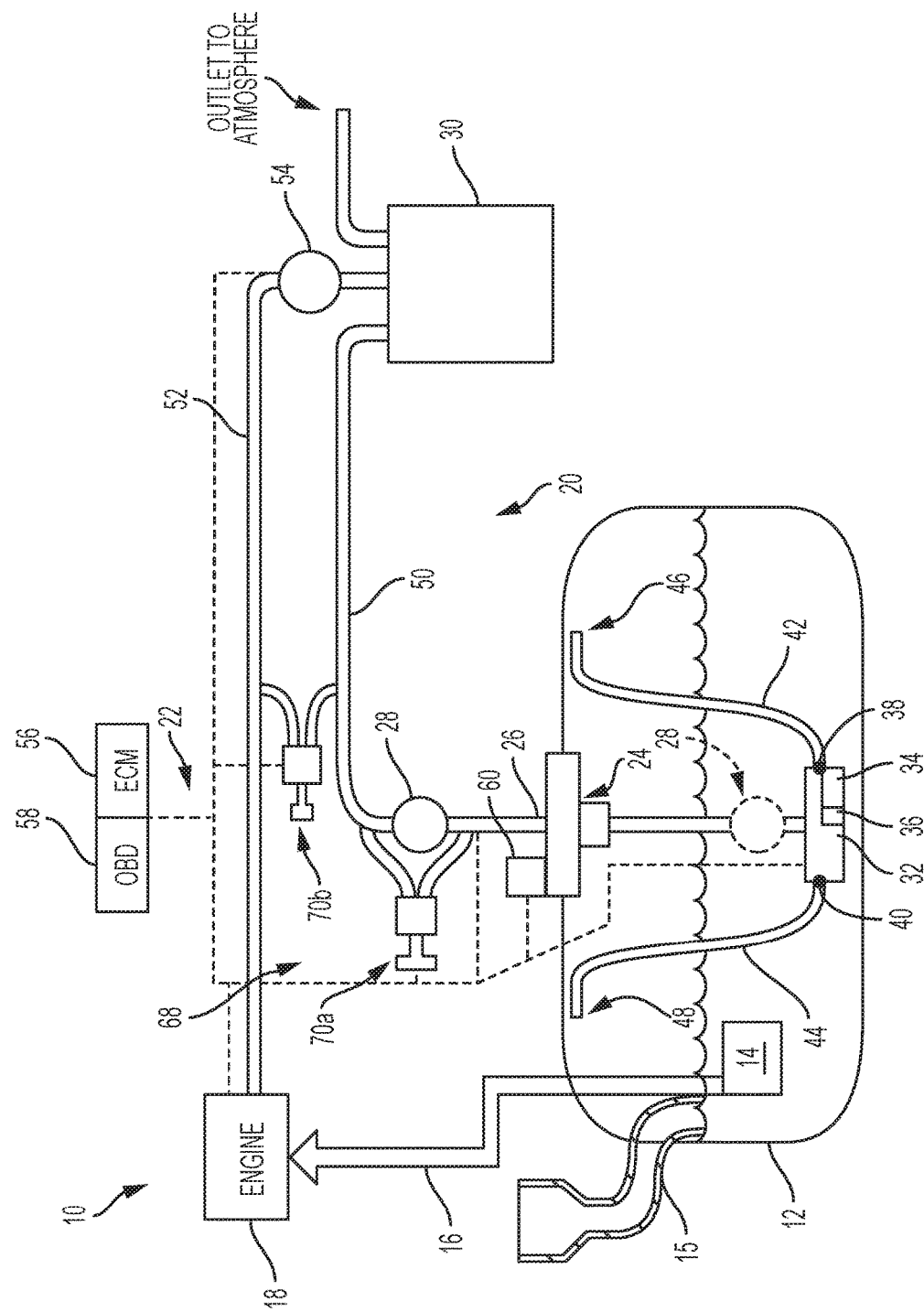
FIG. 1 is a schematic illustration of a fuel tank system having an evaporative emissions control system including an example multiplex director constructed in accordance to one example of the present disclosure.

With initial reference to FIG. 1, a fuel tank system constructed in accordance to one example of the present disclosure is shown and generally identified at reference number 10. The fuel tank system 10 can generally include a fuel tank 12 configured as a reservoir for holding fuel to be supplied to an internal combustion engine via a fuel delivery system, which includes a fuel pump 14 and a filler neck 15. The fuel pump 14 can be configured to deliver fuel through a fuel supply line 16 to a vehicle engine 18. A fuel vapor recovery system 20 can be operably associated with an evaporative emissions control system 22 and can be configured to recapture and recycle fuel vapor emitted in the fuel tank system 10.

The fuel vapor vent and recovery system 20 can generally include a manifold assembly 24, a vent vapor pick-up tube 26, an isolation valve or mechanism 28, and a carbon or purge canister 30.

The manifold assembly 24 can include a vent module 32 having a liquid trap 34, a drain valve 36, a first vent valve 38, and a second vent valve 40. The control module 32 can control the first and second vent valves 38, 40 to selectively open respective first and second vent lines 42 and 44, which terminate at respective first and second vent ports 46 and 48. The liquid trap 34 can include a venturi jet that drains liquid by way of a vacuum out of the liquid trap 34 when the fuel pump is on. In another example, drain valve 36 can be incorporated on the fuel tank system 10. In some implementations, fuel supply line 16 can be routed through manifold assembly 24.

The vapor vent pick-up tube 26 is configured to receive fuel vapor from the manifold assembly 24, and the isolation mechanism 28 is configured to fluidly segregate the venting system 20 from the fuel tank 12 to thereby enable leak detection downstream of the fuel tank 12 with a multiplex director system 68, as is described herein in more detail. In the example illustration, the isolation mechanism 28 is disposed outside of the fuel tank 12. Alternatively, the isolation mechanism 28 may be disposed within the fuel tank 12, for example as part of control module 32 (shown in phantom). A valve 54 may be disposed in the vapor purge line 52 to fluidly segregate the vapor purge line 52 from the vapor vent line 50.

The vapor vent pick-up tube 26 is connected between the fuel tank 12 and the isolation mechanism 28, a vapor vent line 50 is connected between the isolation mechanism 28 and the carbon canister 30, and a vapor purge line 52 is connected between the carbon canister 30 and the engine 18.

Additionally, a control module 60 can further include or receive inputs from a tank pressure sensor, a canister pressure sensor, a temperature sensor, and/or a vehicle grade sensor (not shown). The control module 60 can additionally include fill level signal reading processing, fuel pressure driver module functionality and be compatible for two-way communications with an engine control module (ECM) 56.

As such, in the example implementation, the manifold assembly 24 can be configured to control a flow of fuel vapor between the fuel tank 12 and the purge canister 30. The purge canister 30 can be adapted to collect fuel vapor emitted by the fuel tank 12 and can subsequently release the fuel vapor to the engine 18. The control module 32 can also be configured to regulate the operation of evaporative emissions control system 22 in order to recapture and recycle the emitted fuel vapor.

In the example implementation, the evaporative emissions control system 22 provides an electronically controlled module that manages the complete evaporative system for a vehicle. The evaporative control system 22 can provide a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. The evaporative control system 22 may also be compatible with pressurized systems including those associated with hybrid powertrain vehicles.

The evaporative emissions control system 22 can include an on board diagnostic (OBD) system 58 that can communicate with the ECM 56 and the multiplex director system 68. In the example implementation, the multiplex director system 68 includes a first multiplex director 70a configured to determine if a leak exists fuel tank system 10, and a second multiplex director 70b configured to determine a hydrocarbon concentration in venting system 20. In particular, the first multiplex director 70a is configured to determine if a leak exists in the fuel tank 12 or the venting system 20, and the second multiplex director 70b is configured to determine a hydrocarbon concentration in each of the vapor vent line 50 and the vapor purge line 52.

Figure 2:
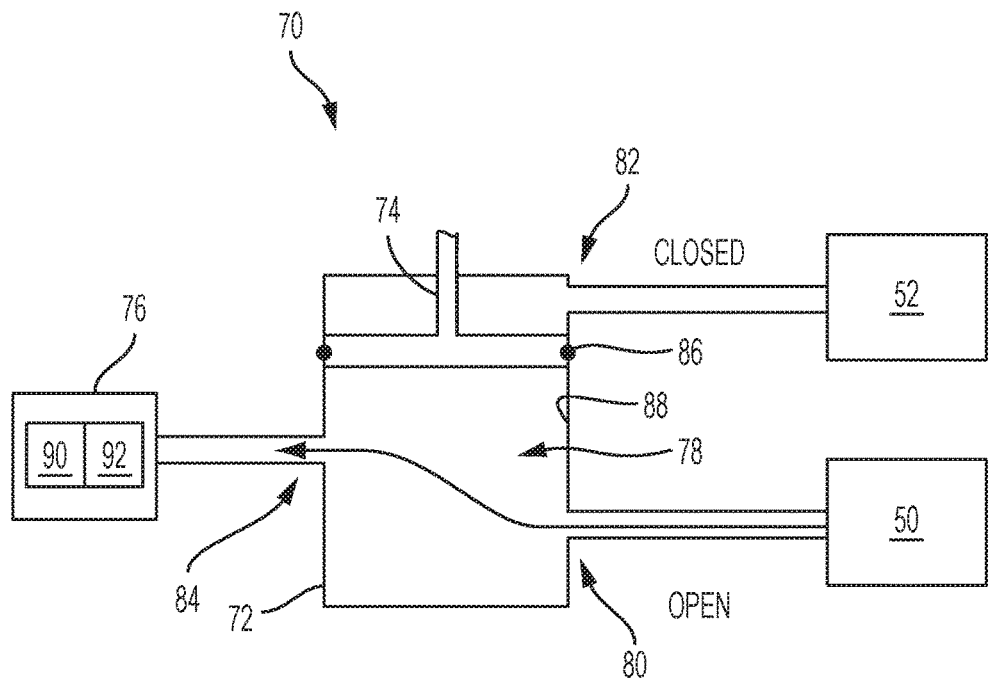
FIG. 2 is a schematic illustration of the multiplex director of FIG. 1 constructed in accordance to one example of the present disclosure and shown in a first position sensing hydrocarbons in a vapor vent line.
Figure 3:
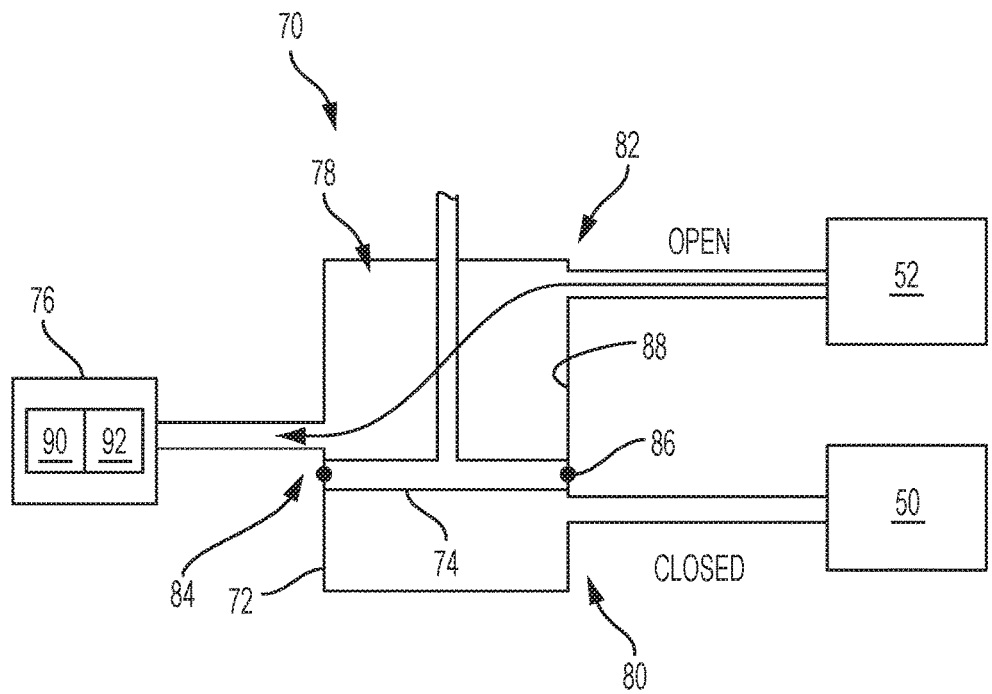
FIG. 3 is a schematic illustration of the multiplex director of FIG. 2 shown in a second position sensing hydrocarbons in a vapor purge line.

With additional reference to FIGS. 2 and 3, the multiplex director 70 can generally include a main housing 72, an actuator 74, and a sensor housing 76. In some examples, the sensor housing 76 may be incorporated into the main housing 72. Main housing 72 defines a chamber 78 and includes a first port 80 fluidly coupled to one portion of the system 10, a second port 82 fluidly coupled to another portion of the system 10, and a third port 84 fluidly coupled to the sensor housing 76. In this way, the first and second ports 80, 82 of the multiplex director 70 can be used to test conditions or properties at two different locations in the fuel tank system 10, which makes it easier to pinpoint the location of an issue that can occur in the system 10 (e.g., a leak).

In the illustrated example, for multiplex director 70a, the first port 80 can be fluidly coupled to the vent vapor pick-up tube 26, and the second port 82 can be fluidly coupled to the vapor vent line 50. For multiplex director 70b, the first port 80 can be fluidly coupled to the vapor vent line 50 and the second port 82 can be fluidly coupled to the vapor purge line 54.

As shown, the actuator 74 can be configured to move between a first position (FIG. 2) and a second position (FIG. 3). A seal 86 can be disposed around the actuator 74 that sealingly engages an inner wall 88 of the main housing 72. Actuator 74 is shown as a piston type or linear type actuator in the example illustration. However, actuator 74 may have any configuration that enables actuator 74 to function as described herein. For example, actuator 74 may be a rotary motion actuator.

In the example implementation, the sensor housing 76 can include a pressure sensor 90 and/or a hydrocarbon sensor 92. The sensors 90, 92 may be separate sensors or may be a single sensor. In other examples, the sensor housing 76 and included sensors 90, 92 may be incorporated into the isolation mechanism 28. The pressure sensor 90 and hydrocarbon sensor 92 can be utilized to monitor pressure and hydrocarbons in vapor vent line 50 and vapor purge line 52. As such, the multiplex director 70 can make use of a single sensor for use in a fuel system with a mechanism to direct vapor flow from different areas. The configuration of the multiplex director 70 can be cost effective by using a single sensor.

In the first position (FIG. 2), the actuator 74 is disposed between the second port 82 and the third port 84 such that the first port 80 is in fluid communication with the third port 84, and the second port 82 is blocked from fluid communication with the third port 84 by the actuator 74. In this position, for multiplex director 70a, when the isolation mechanism 28 is closed, the pressure sensor 90 can monitor the pressure in the fuel tank 12.

For multiplex director 70b, when the isolation mechanism 28 and the valve 54 is closed, the hydrocarbon sensor 92 can monitor the hydrocarbon concentration in the vapor vent line 50. In this way, it can be determined how much hydrocarbon is being loaded into the canister 30.

In the second position (FIG. 3), the actuator 74 is disposed between the first port 80 and the third port 84 such that the second port 82 is in fluid communication with the third port 84, and the first port 80 is blocked from fluid communication with the third port 84 by the actuator 74. In this position, for multiplex director 70a, when the isolation mechanism 28 is closed, the pressure sensor 90 can monitor the pressure in the vapor vent line 50. As such, multiplex director 70a can be switched between the first and second positions to respectively measure the pressures in the fuel tank 12 and the vapor vent line 50. A leak in the system may then be determined to exist if, for example, the measured pressures differ, or one or both measured pressures are at or near atmospheric pressure.

In the second position, for multiplex director 70b, when the isolation mechanism 28 and the valve 54 are closed, the hydrocarbon sensor 92 can monitor the hydrocarbon concentration in the vapor purge line 52. In this way, it can be determined the level of hydrocarbons being sent to the engine 18 from the canister 30. As such, multiplex director 70b can be switched between the first and second positions to respectively measure the hydrocarbon concentrations in the vapor vent line 50 and the vapor purge line 52. The measured hydrocarbon concentrations can then be communicated to the ECM 56 and used to adjust vehicle operations such as to calibrate the engine 18.

The OBD system 58 is in communication with the multiplex director system 68. When the OBD system 58 determines a leak exists, the ECM 56 can subsequently send a signal indicative of such to illuminate a malfunction indicator lamp (MIL) 94. When a hydrocarbon concentration is determined, the ECM 56 can subsequently use the information for vehicle operations such as engine calibration. The ECM 56 may further communicate with the engine 18 to operate in a purge mode where vapor flow is permitted to run through the vapor purge line 52 to the engine 18 where the vapors are subsequently burned.

Figure 4:
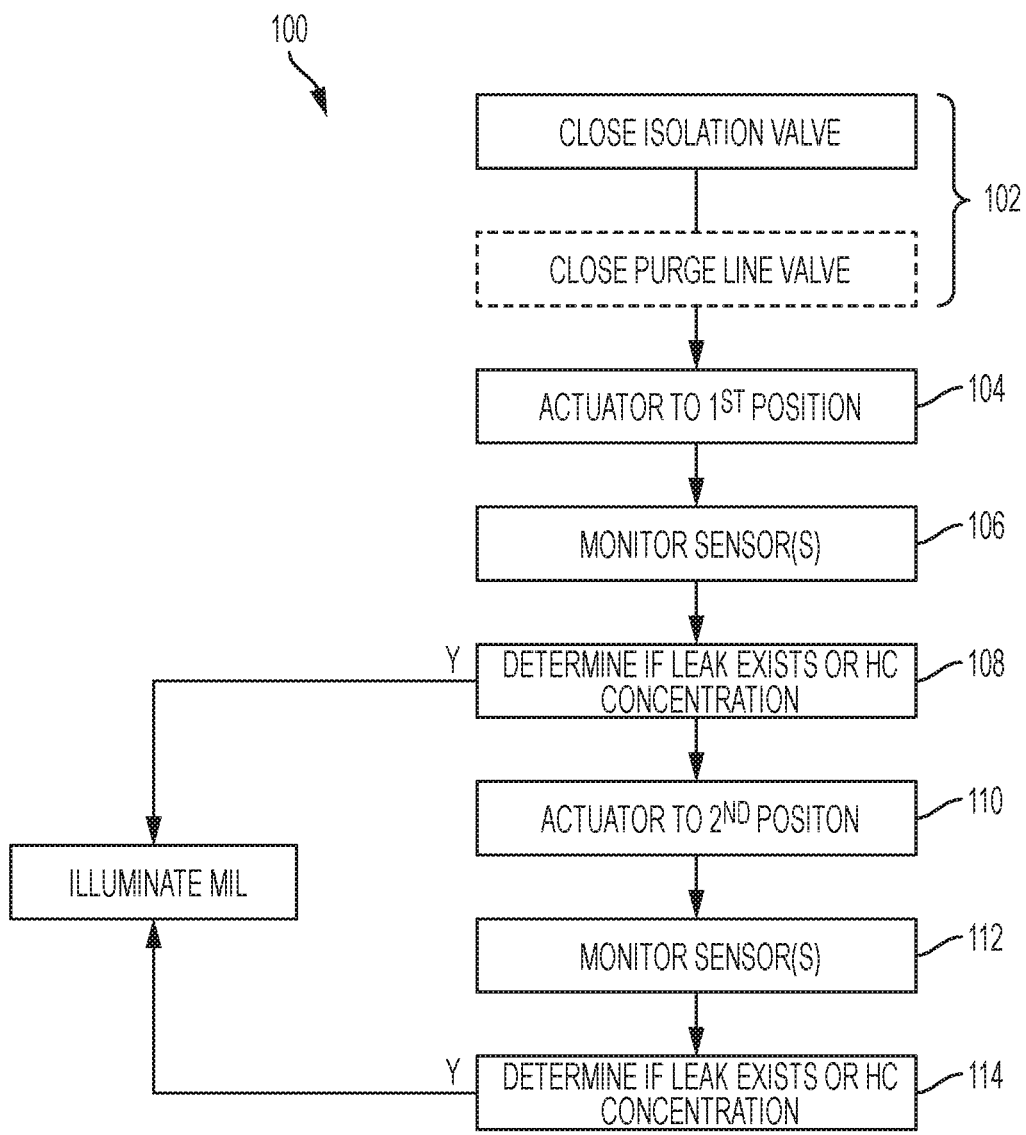
FIG. 4 is an example method of operating the system shown in FIG. 1 in accordance to one example of the present disclosure.

With reference to FIG. 4, an example method 100 of operating the fuel vapor recovery system 20 is described. At step 102, isolation mechanism 28 is closed to fluidly segregate the fuel tank 12 from the vapor vent line 50. Optionally, valve 54 is closed to segregate the vapor purge line 52 from the canister 30 and the vapor vent line 50. At step 104, actuator 74 is moved to the first position (FIG. 2) such that the vapor vent line 50 is in fluid communication with the sensor housing 76 and thus pressure/hydrocarbon sensors 90, 92. At step 106, sensor 90 and/or 92 is monitored. At step 108, OBD system 58 determines if a leak exists in the fuel tank 12 or determines the hydrocarbon concentration in the vapor vent line 50 based on the conditions monitored in step 106.

At step 110, actuator 74 is moved to the second position (FIG. 3) such that the vapor purge line 52 is in fluid communication with the sensor housing 76 and thus pressure/hydrocarbon sensors 90, 92. At step 112, sensor 90 and/or 92 is monitored. At step 114, OBD system 58 determines if a leak exists in the vapor vent line 50 or determines the hydrocarbon concentration in vapor purge line 52 based on the conditions monitored in step 112. If a leak is determined in steps 108 or 114, the OBD system 58 may illuminate MIL 94 or provide another warning indicative of such a condition in the fuel vapor recovery system 20.

Described herein are systems and methods for determining a hydrocarbon concentration and whether a leak exists in a fuel vapor recovery system. The system includes at least one multiplex director that is selectively fluidly coupled between two locations of the fuel vapor recovery system. An isolator mechanism fluidly segregates the fuel vapor recovery system from a fuel tank such that pressure and/or hydrocarbon concentration testing can be done in the fuel tank and outside the fuel tank. With the fuel vapor recovery system segregated, the multiplex director can use a single sensor and switch between two positions to separately monitor pressure/hydrocarbons in, thereby making it easier to pinpoint a leak in the fuel vapor recovery system or monitor hydrocarbon concentration in specific location of the vapor recovery system.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A fuel tank system comprising:
a fuel tank;
a fuel vapor recovery system configured to recapture and recycle emitted fuel vapor, the fuel vapor recovery system including a vapor vent line fluidly coupled between the fuel tank and a canister, and a vapor purge line fluidly coupled to the canister;
an isolation valve disposed in the fuel vapor recovery system to selectively fluidly segregate at least a portion of the fuel vapor recovery system from the fuel tank;
a multiplex director having a sensor wherein, the sensor selectively fluidly coupled to the fuel vapor recovery system on a first side of the isolation valve, and on a second side of the isolation valve,
wherein the multiplex director is movable between a first position where the sensor is fluidly coupled to the fuel vapor recovery system on the first side of the isolation valve and is fluidly blocked from the fuel vapor recovery system on the second side of the isolation valve, and a second position where the sensor is fluidly coupled to the fuel vapor recovery system on the second side of the isolation valve and is fluidly blocked from the fuel vapor recovery system on the first side of the isolation valve,
wherein the sensor is configured to monitor at least one of a pressure and a hydrocarbon concentration in the fuel vapor recovery system when fluidly coupled thereto.

2. The fuel tank system of claim 1, wherein the fuel vapor recovery system on the first side of the isolation valve is a vent vapor tube coupled between the fuel tank and the vapor vent line, and the fuel vapor recovery system on the second side of the isolation valve is the vapor vent line.

3. The fuel tank system of claim 1, wherein the fuel vapor recovery system on the first side of the isolation valve is the vapor vent line, and the fuel vapor recovery system on the second side of the isolation valve is the vapor purge line.

4. The fuel tank system of claim 1, wherein the multiplex director further includes a housing having a first port fluidly coupled to the fuel vapor recovery system on the first side of the isolation valve, and a second port fluidly coupled to the fuel vapor recovery system on the second side of the isolation valve.

5. The fuel tank system of claim 4, wherein the multiplex director housing further includes a third port fluidly coupled to a sensor housing, where the sensor is disposed in the sensor housing.

6. The fuel tank system of claim 5, wherein the sensor comprises a hydrocarbon sensor and a pressure sensor.

7. The fuel tank system of claim 6, wherein the multiplex director further includes an actuator disposed at least partially within the housing, the actuator movable between a first position allowing fluid communication between the sensor and the first port and preventing fluid communication between the sensor and the second port and the first and second ports, and a second position allowing fluid communication between the the sensor and the second port and preventing fluid communication between the sensor and the first port and the first and second ports.

8. The fuel tank system of claim 7, wherein the actuator is a piston.

9. The fuel tank system of claim 7, wherein the actuator is a rotary motion actuator.

10. The fuel tank system of claim 1, wherein the isolation valve is disposed within the fuel tank.

11. The fuel tank system of claim 1, wherein the isolation valve is disposed outside the fuel tank.

12. The fuel tank system of claim 1, wherein the isolation valve is disposed in the vapor purge line to selectively fluidly segregate the vapor purge line from the vapor vent line.

13. The fuel tank system of claim 1, wherein the isolation valve is disposed in the vapor vent line to selectively fluidly segregate the fuel tank from the vapor vent line.

14. The fuel tank system of claim 1, wherein the fuel vapor recovery system further comprises a manifold assembly disposed at least partially within the fuel tank, wherein the manifold assembly includes a vent module having a liquid trap and a drain valve, and wherein the vent module further includes a first vent valve configured to selectively open a first vent line disposed within the fuel tank, and a second vent valve configured to selectively open a second vent line disposed within the fuel tank.

15. A method of operating a fuel vapor recovery system operably associated with a fuel tank system having a fuel tank, the fuel vapor recovery system configured to recapture and recycle emitted fuel vapor and including a vapor vent line fluidly coupled between the fuel tank and a canister, and a vapor purge line fluidly coupled to the canister, the method comprising:
   closing an isolation valve to fluidly segregate the fuel tank from the vapor vent line or the fuel tank from the vapor purge line;
   moving, via a control module, a multiplex director to a first position where the multiplex director is fluidly coupled to the fuel vapor recovery system on a first side of the isolation valve;
   monitoring, via a sensor of the multiplex director, at least one of a pressure and a hydrocarbon concentration in the fuel vapor recovery system on the first side of the isolation valve when in the first position and when the isolation valve is closed;
   moving, via a control module, the multiplex director to a second position where the multiplex director is fluidly coupled to the fuel vapor recovery system on a second side of the isolation valve that is fluidly isolated from the first side when the isolation valve is closed; and
   monitoring, via the sensor, at least one of a pressure and a hydrocarbon concentration in the fuel vapor recovery system on the second side of the isolation valve when in the second position.

16. The method of claim 15, wherein the fuel vapor recovery system on the first side of the isolation valve is a vent vapor tube coupled to the fuel tank, and the fuel vapor recovery system on the second side of the isolation valve is the vapor vent line.

17. The method of claim 15, wherein the fuel vapor recovery system on the first side of the isolation valve is the vapor vent line, and the fuel vapor recovery system on the second side of the isolation valve is the vapor purge line.

18. A fuel tank system comprising:
   a fuel tank;
   a fuel vapor recovery system configured to recapture and recycle emitted fuel vapor, the fuel vapor recovery system including:
      a canister;
      a vent vapor tube fluidly coupled to the fuel tank and configured to receive fuel vapor therefrom;
      a vapor vent line fluidly coupled between the vent vapor tube and the canister; and
      a vapor purge line fluidly coupled to the canister and configured to supply fuel vapor to a vehicle engine;
      an isolation valve to selectively fluidly segregate the vapor vent line from the vapor purge line; and
   a multiplex director comprising:
      a first port fluidly coupled to the vapor vent line;
      a second port fluidly coupled to the vapor purge line;
      a third port fluidly coupled to a sensor housing;
      a sensor disposed in the sensor housing;
      an actuator movable between a first position where the sensor housing is fluidly coupled to the vapor vent line via the first port, and is fluidly blocked from the second port, and a second position where the sensor housing is fluidly coupled to the vapor purge line via the second port, and is fluidly blocked from the first port,
      wherein in the first position, the multiplex director monitors at least one of a pressure and a hydrocarbon concentration in the vapor vent line with the sensor,
      wherein in the second position, the multiplex director monitors at least one of a pressure and a hydrocarbon concentration in the vapor purge line with the sensor.

19. The fuel tank system of claim 18, further comprising a second isolation valve disposed between the vent vapor tube and the vapor vent line to selectively fluidly segregate the vapor vent line from the fuel tank, and a second multiplex director comprising:
   a fourth port fluidly coupled to the vent vapor tube;
   a fifth port fluidly coupled to the vapor vent line;
   a sixth port fluidly coupled to a second sensor housing;
   a second sensor disposed in the second sensor housing;
   a second actuator movable between a first position where the second sensor housing is fluidly coupled to the vent vapor tube via the fourth port, and is fluidly blocked from the fifth port, and a second position where the second sensor housing is fluidly coupled to the vapor vent line via the fifth port, and is fluidly blocked from the fourth port,
   wherein when in the first position, the second multiplex director monitors at least one of a pressure and a hydrocarbon concentration in the vent vapor tube, and
   wherein when in the second position, the second multiplex director monitors at least one of a pressure and a hydrocarbon concentration in the vapor vent line.

20. The fuel tank system of claim 19, wherein the sensor comprises a pressure sensor and a hydrocarbon sensor,
   wherein the fuel vapor recovery system further comprises a manifold assembly disposed at least partially within the fuel tank,
   wherein the manifold assembly includes a vent module having a liquid trap, a drain valve, a first vent valve configured to selectively open a first vent line disposed within the fuel tank, and a second vent valve configured to selectively open a second vent line disposed within the fuel tank.

* * * * *